(12) United States Patent
Prasad et al.

(10) Patent No.: US 12,444,957 B2
(45) Date of Patent: Oct. 14, 2025

(54) BATTERY DISCONNECT MECHANIZATION FOR DIRECT CURRENT FAST CHARGING

(71) Applicant: GM GLOBAL TECHNOLOGY OPERATIONS LLC, Detroit, MI (US)

(72) Inventors: Rashmi Prasad, Troy, MI (US); Chandra S. Namudur, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 770 days.

(21) Appl. No.: 17/749,215

(22) Filed: May 20, 2022

(65) Prior Publication Data

US 2023/0378776 A1 Nov. 23, 2023

(51) Int. Cl.
*H02J 7/00* (2006.01)
*B60L 53/10* (2019.01)
*H01H 71/12* (2006.01)

(52) U.S. Cl.
CPC .............. *H02J 7/0031* (2013.01); *B60L 53/11* (2019.02); *H01H 71/12* (2013.01); *H02J 7/0068* (2013.01)

(58) Field of Classification Search
USPC ......................................................... 320/164
See application file for complete search history.

(56) References Cited

U.S. PATENT DOCUMENTS

2013/0082663 A1* 4/2013 Mori ..................... H02J 7/0068
320/135

OTHER PUBLICATIONS

WO-2019082776-A1 (Year: 2019).*

* cited by examiner

*Primary Examiner* — Samuel Berhanu

(57) ABSTRACT

A battery system includes a battery pack configured to be selectively connected to an output terminal of the battery system and a DCFC receptacle, a first contactor that is connected between the DCFC receptacle and a first terminal of the battery pack, and a first SSR connected in series with the first contactor between the DCFC receptacle and the first terminal of the battery pack. The first SSR has an open state where current from the DCFC receptacle to the battery pack is interrupted and a closed state where current flows from the DCFC receptacle to the battery pack, the first SSR is configured to transition from the closed state to the open state prior to the first contactor, and current only flows from the DCFC receptacle to the battery pack when both the first contactor and the first SSR are in the closed state.

20 Claims, 6 Drawing Sheets

BATTERY DISCONNECT MECHANIZATION FOR DIRECT CURRENT FAST CHARGING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and, more particularly, to disconnect systems for batteries of electric and hybrid electric vehicles.

Some types of vehicles include only an internal combustion engine that generates propulsion torque. Pure electric vehicles include a battery system and an electric motor. Hybrid vehicles include both an internal combustion engine and one or more electric motors and may include a battery system. The battery system includes one or more batteries or battery modules. Each battery module includes one or more battery cells.

SUMMARY

A battery system includes a first battery pack that includes first and second terminals and is configured to be selectively connected to an output terminal of the battery system and a direct current fast charging (DCFC) receptacle. The battery system further includes a first contactor that is connected between the DCFC receptacle and the first terminal of the first battery pack and has an open state where current from the DCFC receptacle to the first battery pack is interrupted and a closed state where current flows from the DCFC receptacle to the first battery pack, and a first solid state relay (SSR) connected in series with the first contactor between the DCFC receptacle and the first terminal of the first battery pack. The first SSR has an open state where current from the DCFC receptacle to the first battery pack is interrupted and a closed state where current flows from the DCFC receptacle to the first battery pack, the first SSR is configured to transition from the closed state to the open state prior to the first contactor, and current only flows from the DCFC receptacle to the first battery pack when both the first contactor and the first SSR are in the closed state.

In other features, the battery system further includes a second contactor connected to the DCFC receptacle. The second contactor has an open state where current from the DCFC receptacle to the first battery pack is interrupted and a closed state where current flows from the DCFC receptacle to the first battery pack. A second SSR is connected in series with the second contactor. The second SSR has an open state where current from the DCFC receptacle to the first battery pack is interrupted and a closed state where current flows from the DCFC receptacle to the first battery pack. The second SSR is configured to transition from the closed state to the open state prior to the second contactor. Current only flows from the DCFC receptacle to the first battery pack when each of the first contactor, the second contactor, the first SSR, and the second SSR are in the closed state.

In other features, the battery system further includes a second battery pack connected to the first battery pack and including first and second terminals. The second contactor is connected between the DCFC receptacle and the second terminal of the second battery pack. The second SSR is connected in series with the second contactor between the DCFC receptacle and the second terminal of the second battery pack.

In other features, the second battery pack is configured to be connected either one of in parallel with the first battery pack and in series with the first battery pack.

In other features, the battery system further includes a second battery pack including first and second terminals and configured to be connected either one of in parallel with the first battery pack and in series with the first battery pack.

In other features, the DCFC receptacle includes first and second terminals, and the first contactor and the first SSR are connected between the first terminal of the DCFC receptacle and the first terminal of the first battery pack.

In other features, the battery system further includes a second contactor connected between the second terminal of the DCFC receptacle and the second terminal of the second battery pack.

In other features, the battery system further includes a second SSR connected in series with the second contactor.

In other features, the battery system further includes a second SSR connected between the second terminal of the DCFC receptacle and the second terminal of the second battery pack.

In other features, a system includes the battery system and further includes a battery control module configured to separately control opening and closing of the first contactor and the first SSR.

In other features, the battery control module is configured to open the first SSR prior to the first contactor.

In other features, the battery control module is configured to, in response to a request to terminate charging of the first battery pack, open the first SSR prior to the first contactor.

In other features, the battery control module is configured to, in response to a request to charge the first battery pack, close the first contactor prior to the first SSR.

In other features, a vehicle includes the battery system.

A method of controlling charging of a battery system includes connecting a first contactor between a direct current fast charging (DCFC) receptacle and a first terminal of a first battery pack having the first terminal and a second terminal. The first contactor has an open state where current from the DCFC receptacle to the first battery pack is interrupted and a closed state where current flows from the DCFC receptacle to the first battery pack. A first solid state relay (SSR) is connected in series with the first contactor between the DCFC receptacle and the first terminal of the first battery pack. The first SSR has an open state where current from the DCFC receptacle to the first battery pack is interrupted and a closed state where current flows from the DCFC receptacle to the first battery pack. The method further includes, in response to a request to terminate charging of the first battery pack, transitioning the first SSR from the closed state to the open state prior to the first contactor and, in response to a request to charge the first battery pack, transitioning the first contactor from the open state to the closed state prior to the first SSR. Current only flows from the DCFC receptacle to the first battery pack when both the first contactor and the first SSR are in the closed state.

In other features, the method further includes connecting a second contactor between the DCFC receptacle and a second terminal of a second battery pack having a first terminal and the second terminal and connecting a second SSR in series with the second contactor between the DCFC receptacle and the second terminal of the second battery pack.

In other features, the method further includes actuating a plurality of switches to selectively connect the second battery pack either one of in parallel with the first battery pack and in series with the first battery pack.

In other features, the method further includes separately controlling opening and closing of the first contactor and the first SSR.

In other features, the method further includes, in response to a request to terminate charging of the first battery pack, opening the first SSR prior to the first contactor.

In other features, the method further includes, in response to a request to charge the first battery pack, close the first contactor prior to the first SSR.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Electric or hybrid electric vehicles typically include one or more rechargeable batteries or battery modules each including a plurality of battery cells (e.g., arranged in one or more battery packs). A battery system including the batteries may further include a battery disconnect system, unit, or module configured to selectively connect the batteries to various loads and charging receptacles. For example, a charging system or module may be configured to control charging of the batteries when the vehicle is connected to an external power source. In some examples, the batteries may be selectively connected to a direct current fast charging (DCFC) receptacle.

In some examples, one or more contactors are arranged between the DCFC receptacle and the batteries. The contactors are configured to transition between open and closed states. In the closed state, current is permitted to flow from the DCFC receptacle to the batteries. In the open state, current flow is interrupted. Accordingly, while current is flowing through the contactors in the closed state, the contactors may be opened to interrupt the flow of current. In cases where the current is very high (e.g., in the event of a short circuit or other fault) and the contactors attempt to transition from the closed state to the open state, the contactors may be fused in the closed state.

Battery disconnect systems and methods according to the present disclosure are configured to provide fast charging connect and disconnect architecture for selectively connecting the batteries to the DCFC receptacle. For example, one or more solid state switches are connected in series with respective contactors between the DCFC receptacle and respective battery terminals as described below in more detail. The solid state switches may be configured to open more quickly than the contactors to interrupt the flow of current. In this manner, the contactors may be transitioned from the closed state to the open state without fusing. While described with respect to vehicle implementations, the principles of the present disclosure may also be used in suitable non-vehicle implementations.

Figure 1:
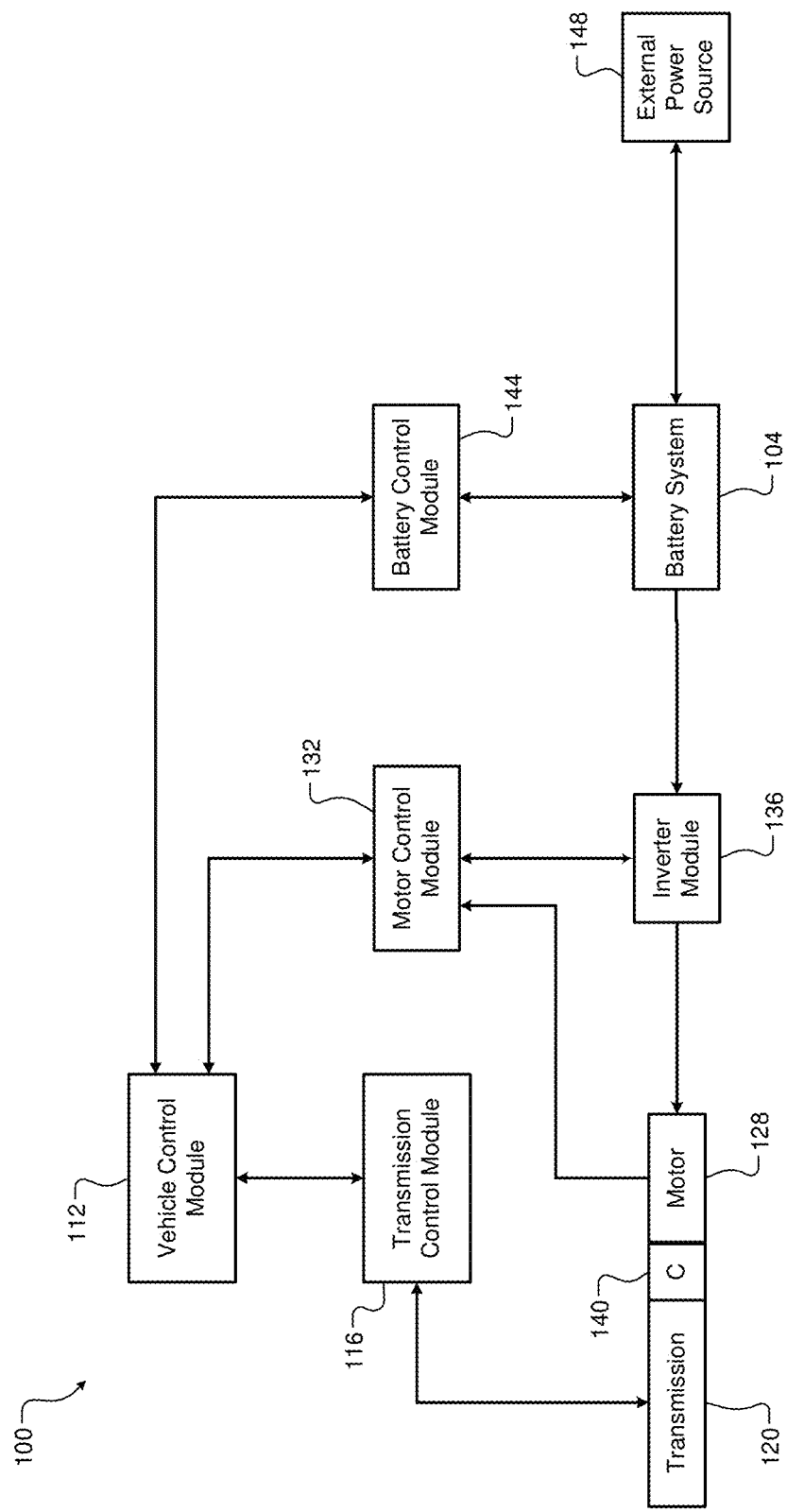
FIG. 1 is a functional block diagram of an example vehicle system including a charging module according to the present disclosure.

Referring now to FIG. 1, a functional block diagram of an example vehicle system 100 according to the present disclosure is shown. The vehicle system 100 may correspond to an autonomous or non-autonomous vehicle. The vehicle may be an electric vehicle including a battery pack or system 104 (as shown). For example, the battery system 104 may comprise two or ore battery packs. In other examples, the principles of the present disclosure may be implemented in a hybrid electric vehicle or a non-vehicle system.

A vehicle control module 112 controls various operations of the vehicle system 100. The vehicle control module 112 may communicate with a transmission control module 116, for example, to coordinate gear shifts in a transmission 120. The vehicle control module 112 may communicate with the battery system 104, for example, to coordinate operation of an electric motor 128. While the example of one electric motor is provided, multiple electric motors may be implemented. The electric motor 128 may be a permanent magnet electric motor or another suitable type of electric motor that outputs voltage based on back electromagnetic force (EMF) when free spinning, such as a direct current (DC) electric motor or a synchronous electric motor. In various implementations, various functions of the vehicle control module 112 and the transmission control module 116 may be integrated into one or more modules.

Electrical power is applied from the battery system 104 to the electric motor 128 to cause the electric motor 128 to output positive torque. For example, a motor control module 132 (e.g., responsive to the vehicle control module 112) may be configured to control an inverter module 136 to apply the electrical power from the battery system 104 to the electric motor 128. The electric motor 128 may output torque, for example, to an input shaft of the transmission 120 or to another component. A clutch 140 may be implemented to couple the electric motor 128 to the transmission 120 and to decouple the electric motor 128 from the transmission 120. One or more gearing devices may be implemented between an output of the electric motor 128 and an input of the transmission 120 to provide one or more predetermined gear ratios between rotation of the electric motor 128 and rotation of the input of the transmission 120.

A battery control module (comprising, for example, a vehicle or battery management system) 144 is configured to control functions of the battery system 104 including, but not limited to, controlling switching of individual battery packs, modules, and/or cells of the battery system 104, monitoring operating parameters, diagnosing faults, etc.

The battery system 104 may be connected to an external power source 148 (e.g., a charging station in a home or other facility, a public charging station, etc.) for charging. In some examples, the external power source 148 is a DCFC power source configured to provide fast charging of the battery system 104 via a DCFC receptacle. The battery system 104 according to the present disclosure implements a battery disconnect system configured to provide improved fast charging connect and disconnect architecture as described below in more detail.

Figure 2:
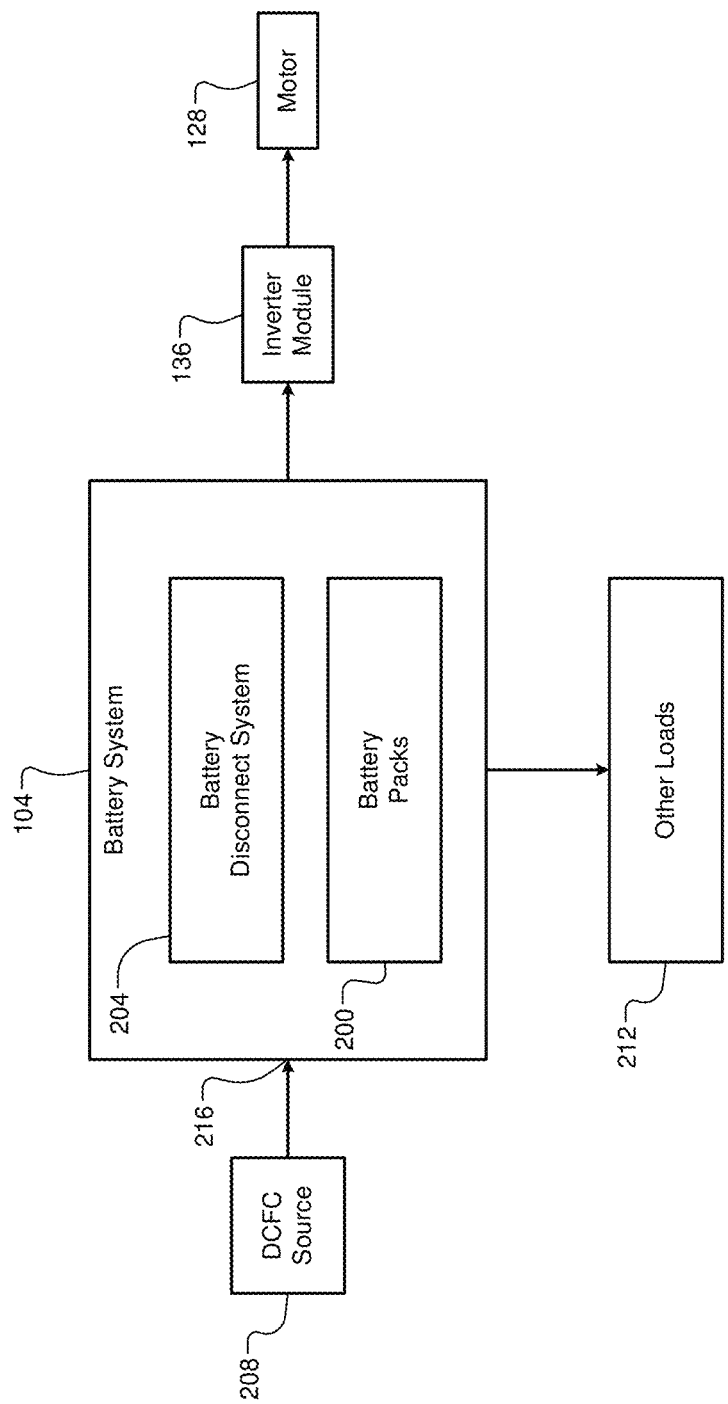
FIG. 2 is a functional block diagram of an example battery system according to the present disclosure.

FIG. 2 shows an example of the battery system 104 in more detail. The battery system includes one or more battery packs 200 and a battery disconnect system (BDS) 204. The battery packs 200 may include two or more battery cells or modules connected parallel, in series, or a combination of parallel and series.

The BDS 204 selectively connects the battery packs 200 to a DCFC source 208 for charging and to the inverter module 136 to provide power to the motor 128 as described above. For example, the inverter module 136 includes components (not shown) such as, but not limited to, a front power inverter module (FPIM), right power inverter module (RPIM), left power inverter module (LPIM), and other integrated power electronics (IPE). The various inverter modules control power flow to respective motors, such as a front motor and left and right rear motors, all represented schematically by the motor 128. The battery packs 200 may also provide power to other loads 212 (e.g., Accessory Power Module (APM) to power 12V DC vehicle loads, HV heating and air conditioning systems, etc.).

The BDS 204 includes a plurality of switches arranged to connect and disconnect power from the DCFC source 208 (e.g., provided via a DCFC receptacle 216) to the battery packs 200 and to connect and disconnect the battery packs 200 to and from the inverter module 136 and the other loads 212. For example, the BDS 204 includes one or more solid state switches and contactors connected between the DCFC receptacle 216 and battery terminals of the battery packs 200 as described below in more detail.

Figure 3A:
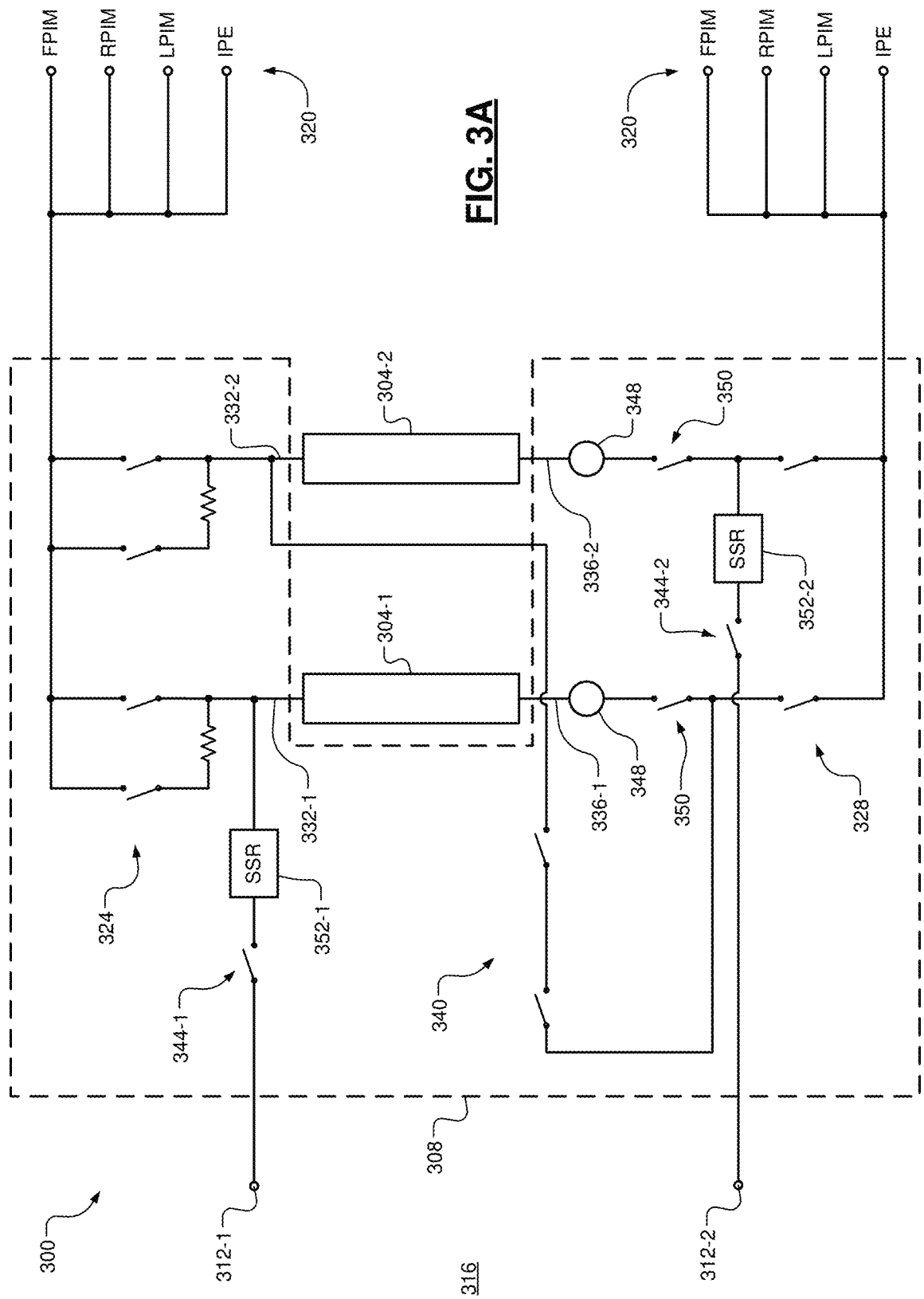
FIGS. 3A-3C are schematic diagrams of an example battery system according to the present disclosure.
Figure 3B:
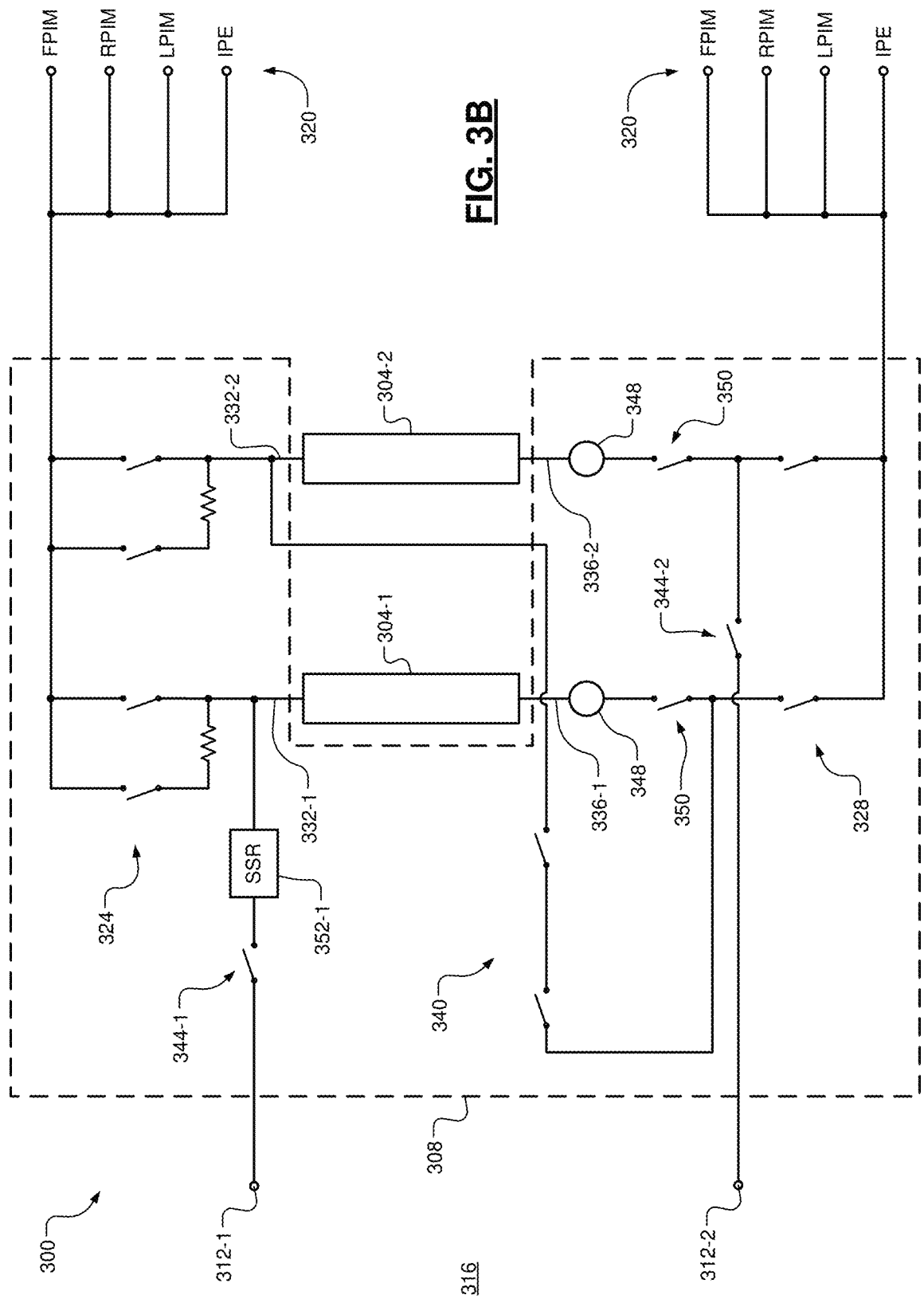
Figure 3C:
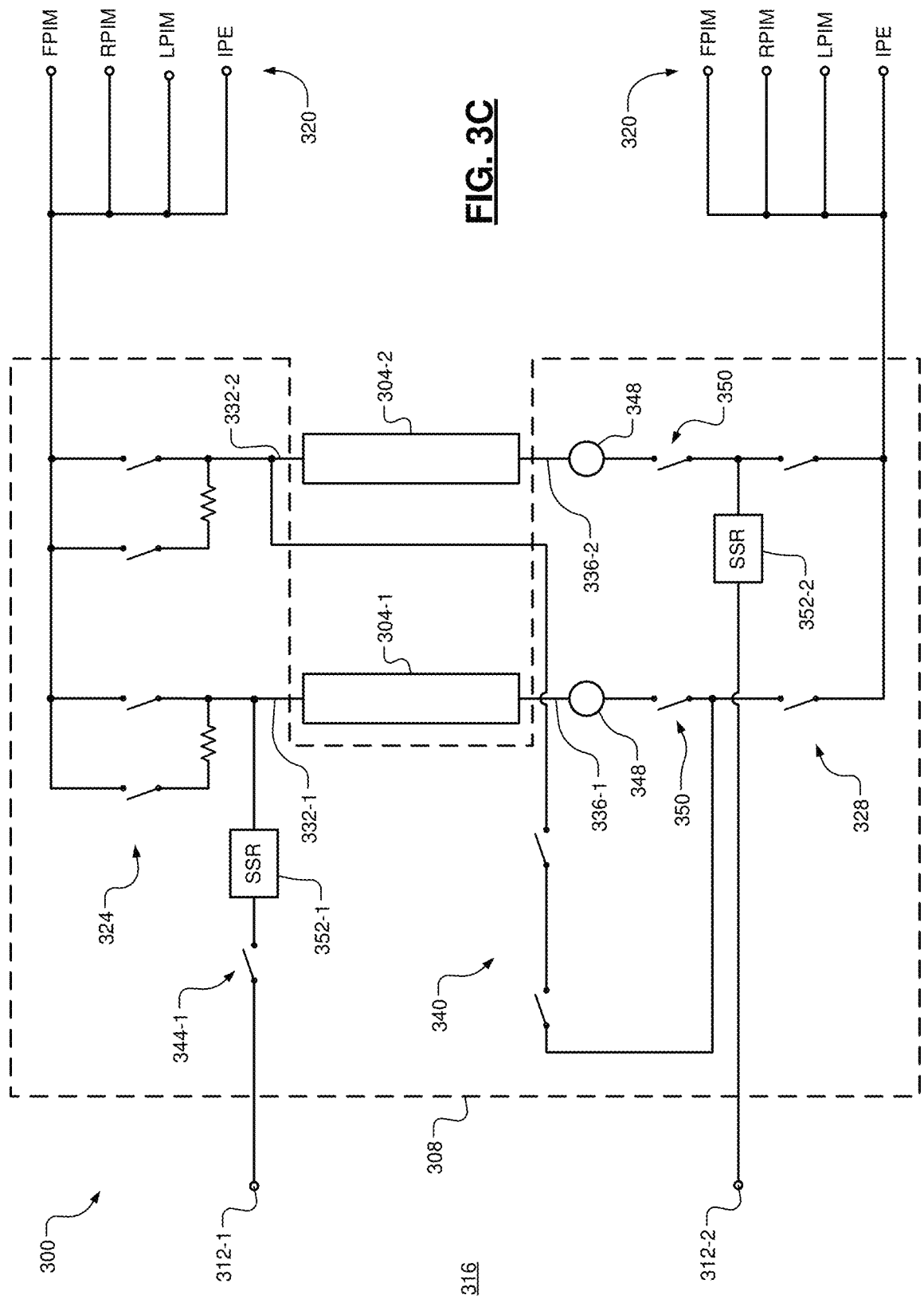

FIGS. 3A-3C shows an example battery system 300 according to the present disclosure. The battery system 300 includes battery packs 304-1 and 304-2 (referred to collectively as battery packs 304) and a BDS 308. Although shown including two of the battery packs 304 connected in parallel, in other examples the battery system 300 may include three or more battery packs connected in parallel, in series, or in a combination of parallel and series connections.

The BDS 308 includes a plurality of switches arranged to connect and disconnect power from terminals 312-1 and 312-2 (referred to collectively as terminals 312) of a DCFC receptacle 316 to the battery packs 304 and to connect and disconnect the battery packs 304 to and from inverter module components (e.g., the FPIM RPIM, LPIM, IPE, etc.) and/or to other loads (not shown in FIG. 3A). For example, the BDS 308 includes one or more solid state switches (e.g., solid state relays, or SSRs) and contactors connected between the DCFC receptacle 316 and the battery packs 304 and between the respective battery packs 304-1 and 304-2, and between the battery packs 304 and output terminals 320 coupled to the inverter module components as described below in more detail. The output terminals 320 may also include connections to other vehicle loads, such as resistive heaters, heating and air conditioning systems, etc.

In one example (as shown in FIG. 3A), the BDS 308 includes sets of switches 324 and 328 arranged to selectively connect respective first terminals 332-1 and 332-2 (referred to collectively as first terminals 332) and second terminals 336-1 and 336-2 (referred to collectively as second terminals 336) of the battery packs 304 to the output terminals 320. Although multiple switches are shown connected in parallel and/or in series arrangements, fewer (e.g., only one) or more switches may be connected in other arrangements between the battery packs 304 and the output terminals 320. Switches 340 may be connected between a first terminal 332 of one of the battery packs 304 (e.g., the first terminal 332-2 of the battery pack 304-2) and a second terminal 336 (e.g., the second terminal 336-1 of the battery pack 304-1) to connect the battery packs 304-1 and 304-2 in series during DC fast charging. In this manner, the switches 324, 328, and 340 can be controlled to selectively connect one, both, or neither of the battery packs 304 to the DCFC receptacle 216 and the output terminals 320, either in series or in parallel.

The BDS 308 includes one or more mechanical relays or contactors 344 (e.g.; contactors 344-1 and 344-2 as shown in FIG. 3A) connected between respective terminals 312 of the DCFC receptacle 316 and the battery packs 304. For example, the contactor 344-1 is connected between the terminal 312-1 and the first terminal 332-1 of the battery pack 304-1 and the contactor 344-2 is connected between the second terminal 336-2 of the battery pack 304-2. The contactors 344 are configured to transition between open and closed states. In the closed state, current is permitted to flow from the DCFC receptacle 316 to the battery packs 304. In the open state; current flow to the battery packs 304 is interrupted. Accordingly, while current is flowing through the contactors 344 in the closed state, the contactors 344 may be opened to interrupt the flow of current.

For example, the contactors 344 may be closed to charge the battery packs 304 in response to a control signal (e.g., from the battery control module 144). Conversely, the contactors 344 may be opened when charging is complete. In some examples, the contactors 344 may be opened in response to signals from one or more current sensors (e.g., current sensors 348). For example, the contactors 344 may be opened in response to current flowing through the battery packs 304 exceeding a predetermined threshold. In some examples, respective fast response pyrotechnic-based switches 350 may be coupled in series with the individual battery packs 304-1 and 304-2 (e.g., as shown in series with current sensors 348 in FIGS. 3A, 3B, and 3C).

The BDS 308 according to the present disclosure further includes solid state switches (e.g., solid state relays SSRs) 352-1 and 352-2 (referred to collectively as SSRs 352) connected in series with the contactors 344. The SSRs 352 may be configured as normally-open (e.g., the SSRs 352 are only closed during charging). The SSRs 352 are configured to open more quickly than the contactors 344 to interrupt the flow of current from the DCFC receptacle 316 to the battery packs 304. For example, the SSRs 352 are responsive to current exceeding a threshold (e.g., in accordance with a current rating or operating characteristics of the SSRs 352). The threshold may the same or less than a threshold at which the contactors 344 are configured to open. Since the SSRs 352 provide faster switching capability than the contactors 344, the SSRs 352 open prior to the contactors 344 when a high current (e.g., due to a short circuit or other fault) flows between the DCFC receptacle, through the contactors 344 and the SSRs 352, and the battery packs 304 in either direction.

In this manner, the SSRs 352 prevent the contactors 344 from being opened while excessive current is flowing through the contactors 344. Instead, the SSRs 352 open prior to the contactors 344, interrupting current flow through the contactors. Although the SSRs 352 may permit the flow of a small amount of leakage current when open, the current flow is essentially zero and the contactors 344 can then be transitioned from the closed state to the open state without arcing or fusing to maintain zero leakage current.

Although shown in FIG. 3A as having two of each of the contactors 344 and the SSRs 352 (e.g., the contactor 344-1 and the SSR 352-1 connected in series between the terminal 312-1 and the battery pack 304-1 and the contactor 344-2 and the SSR 352-2 connected in series between the terminal 312-2 and the battery pack 304-2), in other examples the BDS 308 may include other arrangements. For example, the BDS 308 may include two of the SSRs 352 and only one of the contactors 344, two of the contactors 344 and only one of the SSRs 352, etc.

As shown in FIG. 3B, the BDS 308 includes only the SSR 352-1 connected in series with the contactor 344-1 and the SSR 352-2 is omitted. In another example, the BDS 308 may include only the SSR 352-2 connected in series with the contactor 344-2 and the SSR 352-1 may be omitted. Conversely; as shown in FIG. 3C, the BDS 308 includes only the contactor 344-1 connected in series with the SSR 352-1 and the contactor 344-2 is omitted. In another example, the BDS 308 may include only the contactor 344-2 connected in series with the SSR 352-2 and the contactor 344-1 may be omitted. In still other examples, the BDS 308 may include the contactor 344-1 and the SSR 352-1 while the contactor 344-2 and the SSR 352-2 are omitted or may include the contactor 344-2 and the SSR 352-2 while the contactor 344-1 and the SSR 352-1 are omitted.

In other words, the BDS 308 includes at least one contactor 344 and one SSR 352 connected in series between one of the terminals 312 and the battery packs 304. In this manner, the SSR 352 provides fast switching (relative to the contactor 344) to connect and disconnect the DCFC receptacle 316 to and from the battery packs 304 and to achieve zero leakage current once the charging current interruption is completed by opening at least one of the SSRs 352 and one of the contactors 344 in series with the terminals 312.

Figure 4:
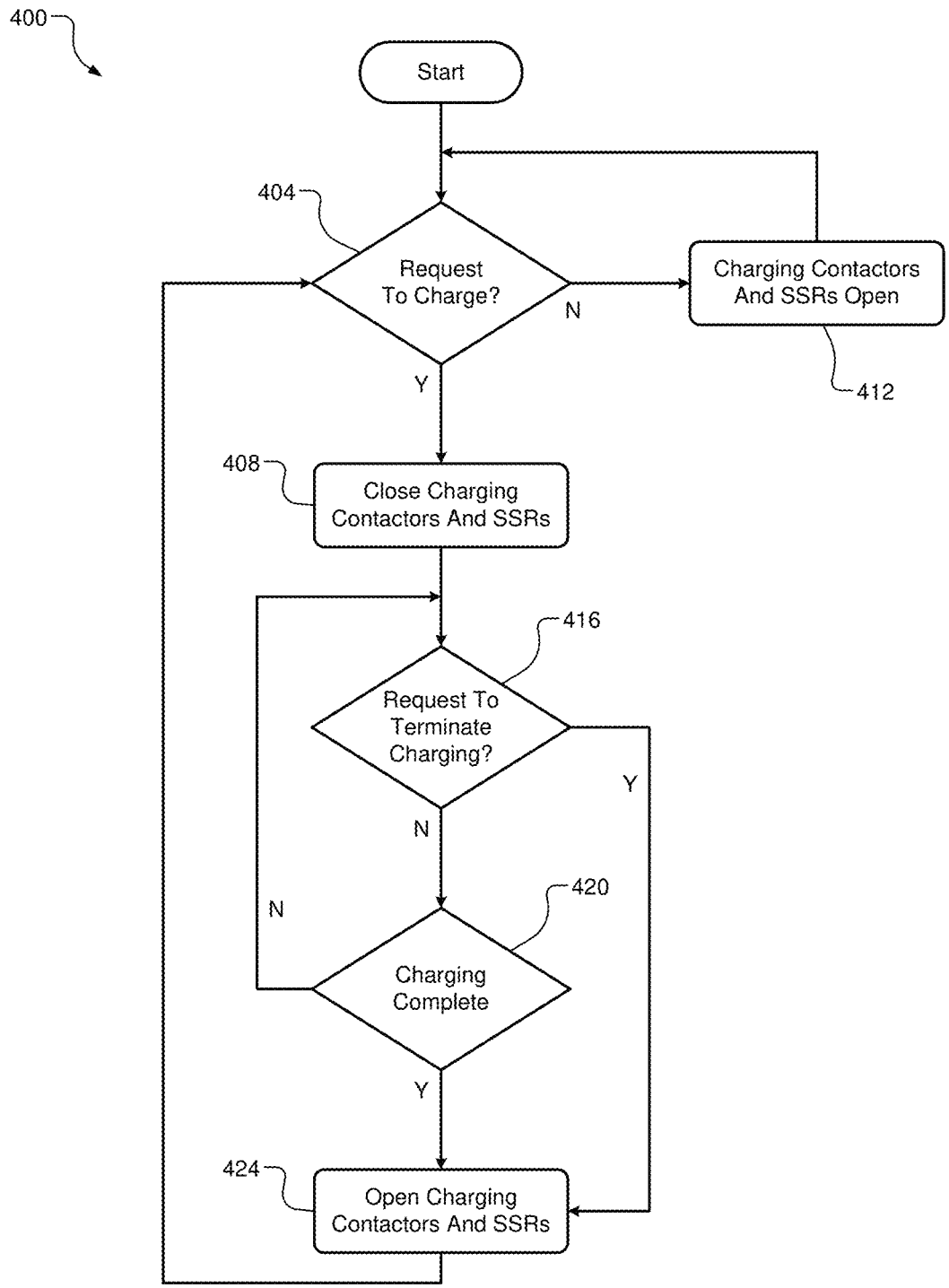
FIG. 4 illustrates steps of an example method of operating a battery disconnect system according to the present disclosure.

FIG. 4 illustrates steps of an example method 400 of operating a battery disconnect system (e.g., the BDS 308) according to the present disclosure. At 404, the method 400 (e.g., the battery control module 144) determines whether a request to charge the vehicle has been received. If true, the method 400 continues to 408. If false, the method 400 continues to 412. At 412, charging contactors and SSRs (e.g., the contactors 344 and the SSRs 352) remain open.

Absent a request to charge the battery packs 304 being received, the contactors 344 and the SSRs 352 are maintained in the open state. Maintaining the contactors 344 and the SSRs 352 in the open state may include opening any of the contactors 344 and the SSRs 352 that may be inadvertently closed to cause unintentional charging. For example, accidents or other impacts with the vehicle, faults or wear of the contactors 344, etc. may cause one or more of the contactors 344 to inadvertently close. Since the SSRs 353 are maintained in a normally open state (i.e., not closed unless charging is specifically requested), inadvertent closing of any of the contactors 344 does not result in charging current flowing to the battery packs 304.

At 408, the method 400 (e.g., the battery control module 144) closes the contactors 344 and then the SSRs 352 to charge the battery packs 304 from the DCFC receptacle 316. Other switches (e.g., the switches 324, 328, 340, etc.) may be open or closed during charging depending on different charging needs and variations. At 416, the method 400 (e.g., the battery control module 144) determines whether a request to terminate charging has been received. If false, the method 400 continues to 420. If true, the method 400 continues to 424.

During charging (e.g., between 408 and 420), the method 400 may also interrupt charging without receiving a specific request to terminate charging. For example, charging may be interrupted in response to current spikes or surges (e.g., due to a short circuit or other fault). The SSRs 352 are configured with internal logic to automatically open in response to current increasing above a predetermined threshold. Since the SSRs 352 are configured to open more quickly than the contactors (and/or may be configured to open at lower current threshold than the contactors 344), the SSRs 352 open prior to the contactors 344 to interrupt current flow through the contactors 344. According, when the contactors 344 are opened due to a current spike, the SSRs 352 have already been opened and the likelihood that opening the contactors 344 will cause arcing or fusing is eliminated.

At 420, the method 400 (e.g., the battery control module 144) determines whether charging is complete. If true, the method 400 continues to 424. If false, the method 400 continues to 416 to continue charging.

At 424, the method 400 (e.g., the battery control module 144) opens the contactors 344 and the SSRs 352. The contactors 244 and the SSRs 352 may be separately controlled. For example, the battery control module 144 may be configured to generate separate control signals for the contactors 244 and the SSRs 352. In this manner, the SSRs 352 may be controlled to open prior to the contactors 244. In one example, the SSRs 352 are controlled to open prior to the contactors 344 but are controlled to close subsequent to the contactors 344. In other words, the SSRs 352 are controlled in a first to open, last to close manner. Accordingly, current is already interrupted by the opening of the SSRs 352 prior to opening the contactors 344. Conversely, when the contactors 344 are closed, current does not flow until the SSRs 352 are subsequently also closed.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit," The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple nodules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A battery system, comprising:
   a first battery pack including first and second terminals and configured to be selectively connected to (i) an output terminal of the battery system and (ii) a direct current fast charging (DCFC) receptacle;
   a first contactor connected between the DCFC receptacle and the first terminal of the first battery pack, wherein the first contactor has an open state where current from the DCFC receptacle to the first battery pack is interrupted and a closed state where current flows from the DCFC receptacle to the first battery pack; and
   a first solid state relay (SSR) connected in series with the first contactor between the DCFC receptacle and the first terminal of the first battery pack, wherein the first SSR has an open state where current from the DCFC receptacle to the first battery pack is interrupted and a closed state where current flows from the DCFC receptacle to the first battery pack,
   wherein the first SSR is configured to transition from the closed state to the open state prior to the first contactor, and
   wherein current only flows from the DCFC receptacle to the first battery pack when both the first contactor and the first SSR are in the closed state.

2. The battery system of claim 1, further comprising:
   a second contactor connected to the DCFC receptacle, wherein the second contactor has an open state where current from the DCFC receptacle to the first battery pack is interrupted and a closed state where current flows from the DCFC receptacle to the first battery pack; and
   a second SSR connected in series with the second contactor, wherein the second SSR has an open state where current from the DCFC receptacle to the first battery pack is interrupted and a closed state where current flows from the DCFC receptacle to the first battery pack, wherein the second SSR is configured to transition from the closed state to the open state prior to the second contactor, and wherein current only flows from the DCFC receptacle to the first battery pack when each of the first contactor, the second contactor, the first SSR, and the second SSR are in the closed state.

3. The battery system of claim 2, further comprising a second battery pack connected to the first battery pack and including first and second terminals, wherein:

the second contactor is connected between the DCFC receptacle and the second terminal of the second battery pack, and the second SSR is connected in series with the second contactor between the DCFC receptacle and the second terminal of the second battery pack.

4. The battery system of claim 3, wherein the second battery pack is configured to be connected either one of (i) in parallel with the first battery pack and (ii) in series with the first battery pack.

5. The battery system of claim 1, further comprising a second battery pack including first and second terminals and configured to be connected either one of (i) in parallel with the first battery pack and (ii) in series with the first battery pack.

6. The battery system of claim 5, wherein the DCFC receptacle includes first and second terminals, and wherein the first contactor and the first SSR are connected between the first terminal of the DCFC receptacle and the first terminal of the first battery pack.

7. The battery system of claim 6, further comprising a second contactor connected between the second terminal of the DCFC receptacle and the second terminal of the second battery pack.

8. The battery system of claim 7, further comprising a second SSR connected in series with the second contactor.

9. The battery system of claim 6, further comprising a second SSR connected between the second terminal of the DCFC receptacle and the second terminal of the second battery pack.

10. A system comprising the battery system of claim 1 and further comprising a battery control module configured to separately control opening and closing of the first contactor and the first SSR.

11. The system of claim 10, wherein the battery control module is configured to open the first SSR prior to the first contactor.

12. The system of claim 11, wherein the battery control module is configured to, in response to a request to terminate charging of the first battery pack, open the first SSR prior to the first contactor.

13. The system of claim 12, wherein the battery control module is configured to, in response to a request to charge the first battery pack, close the first contactor prior to the first SSR.

14. A vehicle comprising the battery system of claim 1.

15. A method of controlling charging of a battery system, comprising:

connecting a first contactor between a direct current fast charging (DCFC) receptacle and a first terminal of a first battery pack having the first terminal and a second terminal, wherein the first contactor has an open state where current from the DCFC receptacle to the first battery pack is interrupted and a closed state where current flows from the DCFC receptacle to the first battery pack;

connecting a first solid state relay (SSR) in series with the first contactor between the DCFC receptacle and the first terminal of the first battery pack, wherein the first SSR has an open state where current from the DCFC receptacle to the first battery pack is interrupted and a closed state where current flows from the DCFC receptacle to the first battery pack;

in response to a request to terminate charging of the first battery pack, transitioning the first SSR from the closed state to the open state prior to the first contactor; and in response to a request to charge the first battery pack, transitioning the first contactor from the open state to the closed state prior to the first SSR, wherein current only flows from the DCFC receptacle to the first battery pack when both the first contactor and the first SSR are in the closed state.

16. The method of claim 15, further comprising:

connecting a second contactor between the DCFC receptacle and a second terminal of a second battery pack having a first terminal and the second terminal; and connecting a second SSR in series with the second contactor between the DCFC receptacle and the second terminal of the second battery pack.

17. The method of claim of claim 16, further comprising actuating a plurality of switches to selectively connect the second battery pack either one of (i) in parallel with the first battery pack and (ii) in series with the first battery pack.

18. The method of claim 15, further comprising separately controlling opening and closing of the first contactor and the first SSR.

19. The method of claim 15, further comprising, in response to a request to terminate charging of the first battery pack, opening the first SSR prior to the first contactor.

20. The method of claim 19, further comprising, in response to a request to charge the first battery pack, close the first contactor prior to the first SSR.

* * * * *